(12) United States Patent
Mirlay

(10) Patent No.: US 9,667,845 B2
(45) Date of Patent: May 30, 2017

(54) VARIABLE 3-DIMENSIONAL ADAPTOR ASSEMBLY FOR CAMERA

(71) Applicant: Ram Srikanth Mirlay, Bangalore (IN)

(72) Inventor: Ram Srikanth Mirlay, Bangalore (IN)

( * ) Notice: Subject to any disclaimer, the term of this patent is extended or adjusted under 35 U.S.C. 154(b) by 321 days.

(21) Appl. No.: 14/414,147

(22) PCT Filed: Jul. 11, 2013

(86) PCT No.: PCT/IN2013/000429
§ 371 (c)(1),
(2) Date: Jan. 12, 2015

(87) PCT Pub. No.: WO2014/009974
PCT Pub. Date: Jan. 16, 2014

(65) Prior Publication Data
US 2015/0181089 A1    Jun. 25, 2015

(30) Foreign Application Priority Data
Jul. 13, 2012  (IN) ............................. 2845/CHE/2012

(51) Int. Cl.
| H04N 13/02 | (2006.01) |
| G06T 15/00 | (2011.01) |
| H04N 5/225 | (2006.01) |
| G02B 27/10 | (2006.01) |
| G03B 17/56 | (2006.01) |
| G03B 35/10 | (2006.01) |

(52) U.S. Cl.
CPC ....... *H04N 5/2254* (2013.01); *G02B 27/1066* (2013.01); *G03B 17/565* (2013.01); *G03B 35/10* (2013.01); *H04N 13/0203* (2013.01)

(58) Field of Classification Search
CPC ............. H04N 13/0203; H04N 5/2254; G02B 27/1066; G03B 17/565; G03B 35/10
See application file for complete search history.

(56) References Cited

U.S. PATENT DOCUMENTS

| 5,570,150 A | 10/1996 | Yoneyama et al. |
| 5,828,913 A * | 10/1998 | Zanen .................... G01C 11/06 348/E13.007 |
| 5,883,662 A | 3/1999 | Zanen |
| 8,390,675 B1 * | 3/2013 | Riederer ............ H04N 13/0239 348/158 |

(Continued)

FOREIGN PATENT DOCUMENTS

| GB | 308839 A | 6/1930 |
| WO | 2011/111061 A2 | 9/2011 |
| WO | 2012/007957 A1 | 1/2012 |

OTHER PUBLICATIONS

International Search Report for PCT/IN2013/000429 dated Dec. 17, 2013.

*Primary Examiner* — Dave Czekaj
*Assistant Examiner* — Tsion B Owens
(74) *Attorney, Agent, or Firm* — Sughrue Mion, PLLC

(57) ABSTRACT

An adaptor assembly for a 2-dimensional (2-D) digital camera provided with a variable 3-dimensional (3-D) photography assist arrangement, having a peripheral neck portion connected a rotatable and a movable neck portion having image capturing and transferring arms, to render an enhanced depth perception of a spatial image of a target-object and with zero eccentricity between left and right images.

13 Claims, 11 Drawing Sheets

(56) References Cited

U.S. PATENT DOCUMENTS

2008/0239063 A1* 10/2008 Ishikawa ............ G02B 23/2415
                                                             348/46
2012/0154549 A1* 6/2012 An ....................... G03B 17/565
                                                             348/49

* cited by examiner

VARIABLE 3-DIMENSIONAL ADAPTOR ASSEMBLY FOR CAMERA

FIELD OF INVENTION

The present disclosure relates to an adaptor assembly for a 2-dimensional (2-D) digital camera with a variable 3-dimensional (3-D) photography assist arrangement, to render an enhanced depth perception of a spatial image of a target-object and with zero eccentricity between left and right images.

DESCRIPTION OF RELATED ART

Stereoscopic photography in a known way creates a 3-D illusion starting from a pair of 2-D images. The easiest way to enhance depth perception in a human brain is to provide the eyes of the viewer with two different images, representing two perspectives of the same object, with a certain deviation approximately equal to or variably greater than the perspectives that both eyes naturally receive in binocular vision.

Stereo lenses are present, which could turn an ordinary film camera into a stereo camera by using a special double lens to take two images and direct them through a single lens to capture them side-by-side on the film. By mounting two cameras on a bracket, spaced apart a bit, with a mechanism wherein pictures can be taken at the same time. The precise methods for camera control have also allowed the development of multi-rig stereoscopic cameras where different slices of scene depth are captured using different inter-axial settings. The images of the slices are then composed together to form the final stereoscopic image pair. This allows important regions of a scene to be given better stereoscopic representation while less important regions are assigned less of the depth budget.

There have been cameras having dual camera system which work on a parallax phenomenon. The detector heads of such cameras remain parallel and never converge. There is a lateral separation of the two cameras and their visual input sources. Hence, the target goes out of the field of vision of one of the cameras. In other cameras, the axes of the two cameras are diverging and generally they deal with creating a 3-D virtual reality environment and models, not a 3-D vision or view.

Moreover in some dual camera systems, the two cameras are so fixed and so held together that the inter-camera distance remains fixed. So the whole camera system has to be adjusted for taking images from different angles. Also, these camera systems have single eyepiece/objective, which affects their functionality.

A variable 3-D camera is disclosed in PCT/IN2011/000145 of the present applicant, with dual-camera assemblies, in which the cameras are adjustable and moved synchronously to each other to provide a 3-D view of the objects. However, in this arrangement, the left and right pathways of a target-object are permitted to pass through two different converging optical devices, before they are displayed on two different display devices such as LCDs and/or viewed through left and right eye pieces. The de-association of left and right images on two different LCDs would make the simultaneous image viewing cumbersome, as the natural binocular vision of a user converges on either one image, at a given time. In a camera with variable 3-D viewing capabilities, the left and right eyes will find it difficult to comfortably view the tilted images due to the limited capacity of the eye muscles, resulting in excessive convergence/divergence/cyclotorsion. These excessive convergence/divergence/cyclotorsion causes eye and neck strain while using the camera, which may also result in an inability to fuse left and right images, that is required to attain 3-D vision or depth perception.

A variable 3-D microscope is disclosed in PCT/IN2011/000141 of the present Applicant, in which a 3-D microscope with arms is disclosed. However, the 3-D microscope is an image viewing device with a magnification, to render a 3-D view of an object to a user' eyes.

U.S. Pat. No. 5,570,150 discloses A stereo photographing system having a stereo adapter for photographing two separate images of a same subject viewed from different points and formed onto one picture frame next to each other, and a camera including a finder and a photographing lens to which the stereo adapter can be detachably attached at the front end of the photographing lens. A problem with U.S. Pat. No. 5,570,150 is a mismatch in the views between a view-finder view and a stereo adaptor view, when an adaptor is fixed to the lens barrel of a camera, resulting in a horizontally-short image since the stereo adaptor hinders the view-finder view. Another problem of U.S. Pat. No. 5,570,150 is longitudinal distortion caused by the horizontally placed adaptor.

U.S. Pat. No. 5,883,662 discloses an apparatus for creating a pair of images for use in stereo photography or photogrammetry, and adjusting the overlap of the images by automatically adjusting the convergence of a pair of image gathering devices and by placing an adaptor having a set of mirrors located in front of a camera lens. The outer two mirrors face generally outward along the optical axis of the lens. The centers of the outer two mirrors are spaced apart by an appropriate interocular distance. The convergence of the two outer mirrors is adjustable by swiveling them simultaneously and equally about their centerlines with a ganging mechanism. A problem with U.S. Pat. No. 5,883,662 is the fixed position between the mirrors which permits a limited degree of 3D vision resulting in the limited depth angle (angle between right optical axis and the left optical axis at the target). Further, the adaptor as in U.S. Pat. No. 5,883,662 is operable in a single horizontal plane.

GB 308 839 discloses an apparatus comprises two tubular arms g, telescopic and horizontal, arranged one above the other at a distance equal to the height of one picture. These two arms can assume different and symmetrical angular positions in relation to a common vertical axis, and to the free end of each arm is secured a reflecting device, consisting for example in a totally reflecting prism g. A problem of GB 308 839 is that the objectives are separated vertically and human brain cannot perceive the fusion of left and right 3-D images of a target-object as they are vertically separated.

Therefore, there is a need to provide a variable 3-D adaptor assembly that can easily fit onto existing 2-D digital cameras, to capture left and right images of a target-object, at variable depth angles, to superimpose the images on a single display device.

OBJECTS OF THE PRESENT INVENTION

The present disclosure relates to an adaptor assembly for a 2-D digital camera, with a variable 3-D photography assist arrangement, to render a variable and enhanced 3-D depth perception of a spatial image of a target-object, to the 2-D camera.

An object of the present invention is to provide an adaptor assembly for 2-D digital camera with a variable 3-D photography assist arrangement, to prevent tilting of the camera while viewing and capturing a target-object at variable converging angles.

Another object of the present invention is to provide an adaptor assembly for a 2-D digital camera with a variable 3-D photography assist arrangement in which the adaptor assembly is detachable and equipped with frontal and rotary movements, which are regulated by a digital processor and a 3-D tracking mechanism.

Yet another object of the present invention is to provide an adaptor assembly for 2-D digital camera with a variable 3-D photography assist arrangement in which image capturing and transferring arms are movably connected to the adaptor.

Still another object of the present invention is to provide an adaptor assembly for 2-D digital camera with a variable 3-D photography assist arrangement to automatically actuate and lock image capturing and transferring arms at various converging angles.

It is also an object of the present invention to provide an adaptor assembly for 2-D digital camera with a variable 3-D photography assist arrangement to render a zero eccentricity to the left and right images that are captured.

SUMMARY OF THE INVENTION

An adaptor assembly for a 2-dimensional (2-D) digital camera provided with a variable 3-dimensional (3-D) photography assist arrangement, having a peripheral neck portion connected a rotatable and a movable neck portion having image capturing and transferring arms, to render an enhanced depth perception of a spatial image of a target-object and with zero eccentricity between left and right images.

DESCRIPTION OF THE INVENTION

A digital camera generally include an arrangement of the components such as a digital sensor chip/film, a lens, a view finder/LCD screen, a shutter, a flash, a memory card, an autofocus mechanism, an image stabilization mechanism, a battery storage zone, lens rings, controls for memory, light sensors, Charge Couple Device (CCD), Complementary Metal Oxide Semiconductor (CMOS), a speaker, a power switch, a flash one/two, a PC/AV terminal, a tripod socket, a buttons or controls for power, a zoom, a shutter release, a menu for selection of items etc.

Figure 1:
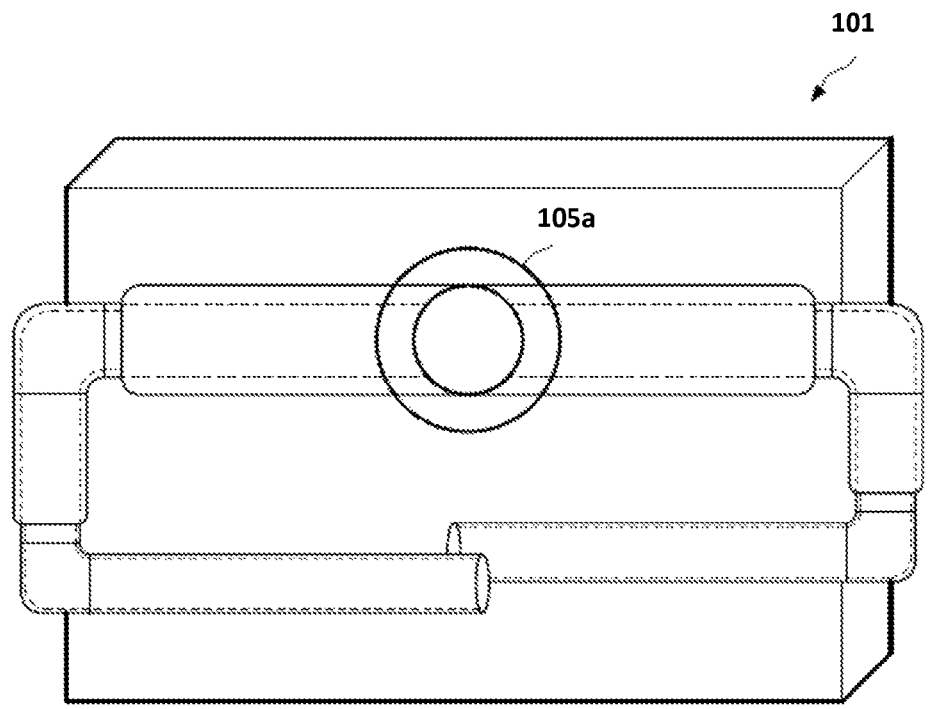
FIG. 1 illustrates a front perspective view of the adaptor assembly with variable 3-D photography assist arrangement, connected to a camera with image capturing and transferring arms in folding positions.

The adaptor assembly 101 with variable 3-D photography assist arrangement, for a digital camera, is detachably connected to a camera 100, which can be a standard 2-D camera, as shown in FIG. 1. Image capturing and transferring arms, as hereinafter described, which are used to capture left and right spatial images of a target-object 103, at variable depth angles, are shown connected to the 3-D adaptor assembly 101 and arranged in retracted or folded position.

Figure 2:
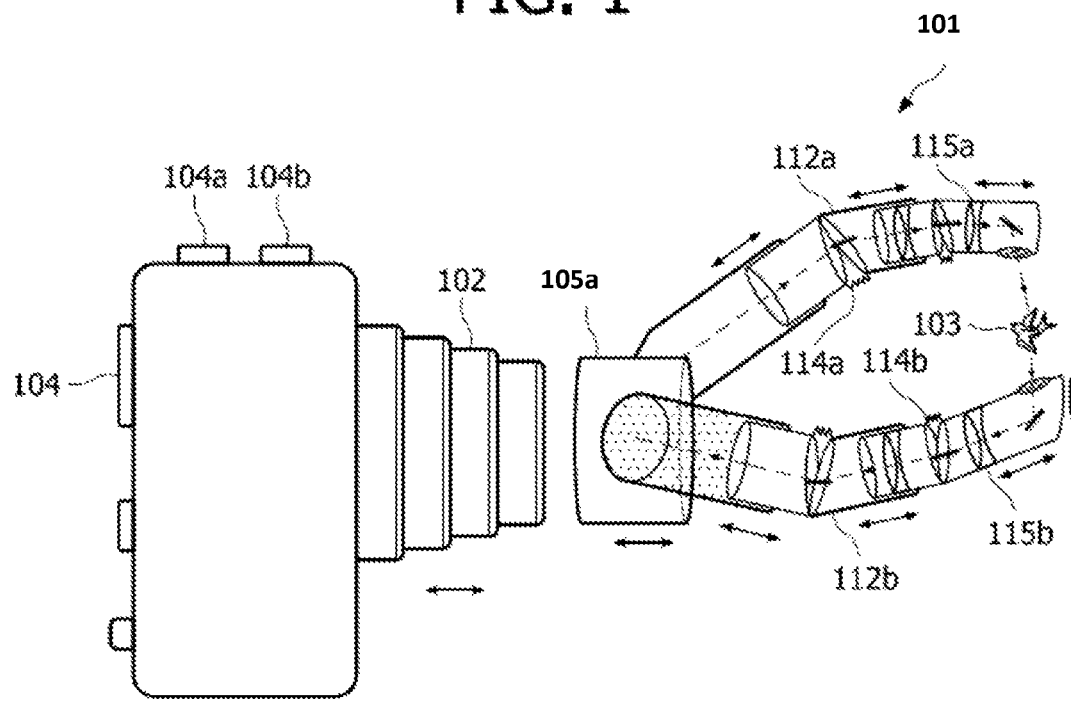
FIG. 2 is an isometric view of the adaptor assembly with variable 3-D photography assist arrangement, with adaptor shown in detached position and image capturing and transferring arms in open and extended positions.

The adaptor assembly for 2-D digital camera, with a variable 3-D photography assist arrangement 101 of the present disclosure, as shown in FIG. 2 is detachably connected to the digital camera 100, to render an enhanced 3-D depth perception of a spatial image of a target-object 103. The 3-D adaptor assembly 101 detachably engages with a lens barrel 102, of the digital camera 100. The lens barrel 102 acts as a housing for optical systems of the digital camera 100, such as a converging lens and lens, prism and mirror complex, to receive, regulate and transmit optical or light pathways of an image of the target-object 103, before they are viewed by a user through a display unit 104, preferably in conjunction with polarized 3-D glasses. The lens barrel 102 is also equipped to employ more than one converging and diverging lens complex 108, to receive the optical pathways of the image, separately, from the target-object 103. The display unit 104 can be one among a LCD screen, a light emitting diode (LED) display screen or a plasma display screen (PDP). The lens barrel 102 is generally provided with a retractable arrangement to adjust the focal length between the target object 103 and lens arrangement of the camera 100. The digital camera 100 as illustrated and described herein is generally used for still photography but can also be one that carries out a video photography.

In an aspect of the present disclosure of the adaptor assembly with a variable 3-D photography assist arrangement as shown in FIG. 2, the adaptor assembly 101 is connected to left and right image capturing and transferring arms 111a and 111b. The adaptor assembly 101 is connected to the camera 100 having among other features, camera control switches 104a and 104b, to control various operations of the camera, and the adaptor assembly 101 optically aligned with optical elements such as converging and diverging lens complex 108, Charge Couple Device (CCD) 118 and display unit 104.

Figure 3:
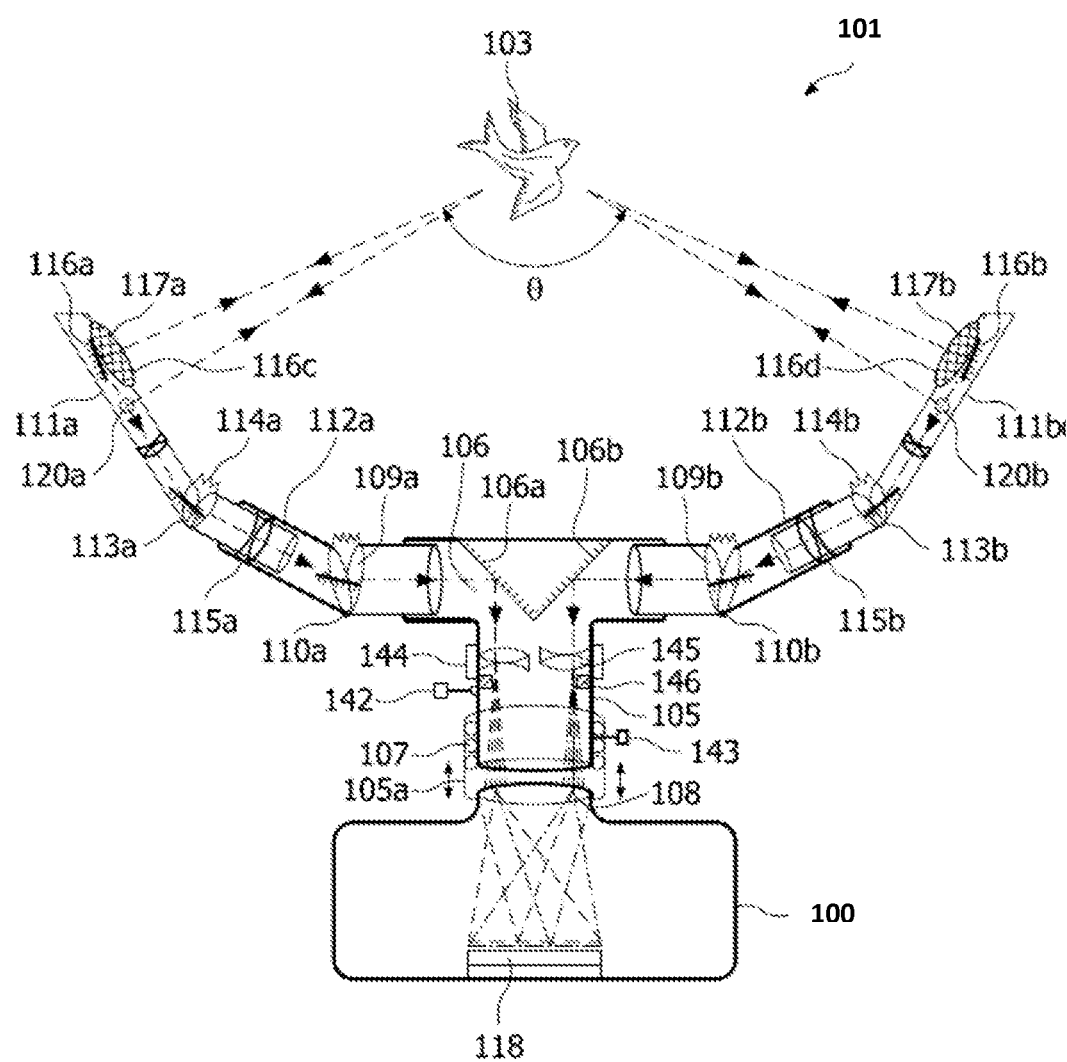
FIG. 3 illustrates a cross-sectional view of the adaptor assembly with variable 3-D photography assist arrangement, depicting functional elements of the adaptor for actuating rotary and frontal movements of the image capturing and transferring arms.

The adaptor assembly 101 as shown in FIG. 3 is defined by a peripheral neck portion 105a, which is a hollow cylindrical member made of metal, alloy, polymer or a material, which is combination of the listed materials. Proximal end of the peripheral neck portion 105a is movably and detachably connected to the lens barrel 102. The connection of the peripheral neck portion 105a with the lens barrel 102 is one of suitable fixtures such as press-fit, strap-fit, snap-fit or threaded having the desired locking arrangement so that the peripheral neck portion 105a mates with the lens barrel 102. The shape and configuration of the peripheral neck portion 105a is shown advantageously as cylindrical and it is understood that other suitable non-cylindrical shapes and symmetries can be suitably adopted for use.

A rotatable and movable neck portion 105, with proximal and distal ends and made of metal, alloy, polymer or a material or a combination formed of the listed materials, is permitted to pass through the peripheral neck portion 105a through its proximal end and terminates in proximity to the lens barrel 102 by leaving an intervening space between the lens barrel 102 and its proximal end, to permit fore and apt movement of the neck portion 105, parallel to the axis of the lens barrel 102 of the camera 100, as shown in FIG. 3. The reciprocal arrangement of the rotatable and the movable neck portion 105 and the peripheral neck portion 105a is such that a raceway is formed in between the movable neck portion 105 and the peripheral neck portion 105a. The shape and configuration of the neck portion 105 is shown advantageously as cylindrical and it is understood that other suitable non-cylindrical shapes and symmetries can also be suitably adopted for use.

Rolling mass bodies 107 disposed in the raceway abutting the inner surface of the peripheral neck portion 105a and the outer surface of the neck portion 105, to provide a rotational and fore and apt movement support for the neck portion 105 vis-à-vis the peripheral neck portion 105a. The neck portion 105 is arranged not only to rotate about its circumferential axis or its rotational axis but also to move parallel to the axis of the lens barrel 102. The rolling mass bodies that can be suitably adapted for use include ball bearing, roller thrust bearing and needle bearing or a combination thereof.

In another aspect of the present invention, in the absence of the bearing arrangement, the inner surface of the peripheral neck portion 105a and the outer surface of the neck portion 105 are provided with smoother surfaces and these surfaces are abutted together. In this arrangement, the neck portion 105 rotates, moves and glides on actuation. The neck portion 105, which is enclosed in the peripheral neck portion 105 can also be suitably lubricated. The surfaces of the neck portion 105 and peripheral neck portion 105a can also be advantageously treated with Teflon® or with materials such as polysiloxane, to impart friction free movement to the neck portion 105.

In yet another aspect of the present invention a combination arrangement of rolling mass bodies and the surfaces of the neck portion 105a and the peripheral neck portion 105a coated with friction-free coatings is incorporated to effect the sliding and rotating movement of the neck portion 105. The actuation of the movement of the neck portion 105 of the adaptor is by means of an electro-mechanical arrangement, which is controlled by a digital processor.

Figure 11:
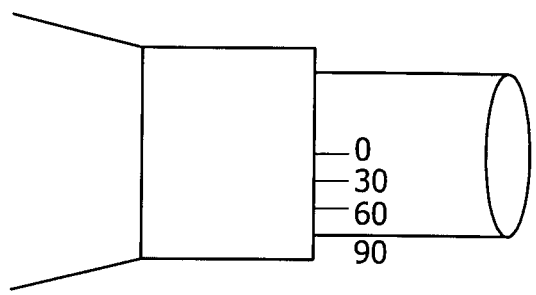
FIG. 11 illustrates side views of the adaptor assembly with variable 3-D photography assist arrangement having indicators.
Figure 11:
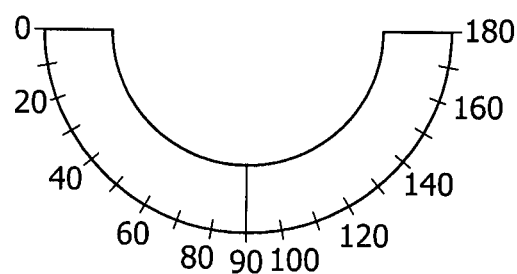
Figure 11:
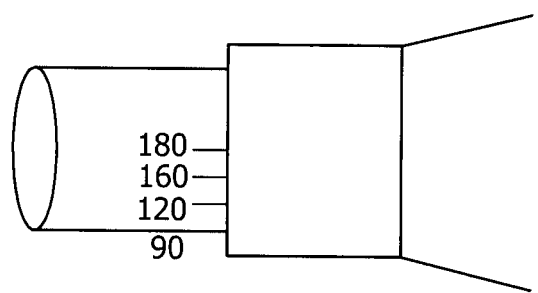

In another aspect of the present invention as shown in FIG. 11, which depicts side views of the neck portion 105 of the adaptor assembly 101 with plurality of indicators are arranged on the neck portion 105, ranging from 0-360°. A reference indicator is also arranged on the peripheral neck portion 105a. These markings help in locking the movable neck portion 105, at a pre-determined angle, once the desired variable 3-D angle is determined by digital processor. Plurality of locking arrangement is also provided at the indicators to arrest the rotation of the movable neck portion 105 at various angular positions.

In the course of normal use of a camera for photography, especially while capturing 3-D images at variable converging angles; tilting of the camera is a normal occurrence. This anomaly may also impart eccentricity to the left and right images of a target-object that are being captured. In order to overcome this limitation, in the adaptor assembly 101 with a variable 3-D photography assist arrangement of the present invention, an anti-tilt lock device 143 is provided on the neck portion 105 to lock and maintain the horizontal or any desired angular position of the camera 100, once image capturing and transferring arms 111a and 111b are locked on to the target-object 103. Advantageously a pin-type anti-tilt lock device 143 supported with a biasing spring that generate anti-tip or resistive forces, to resist the tilting of neck portion 105 is used in the present invention. However, other suitable anti-tilt lock devices including pneumatic shafts can be used. If deemed necessary, a suitable damping arrangement to generate the anti-tip or resistive force can also be provided. The locking device arrests the image capturing arms 111a and 111b at any desired angle, to take oblique variable 3D photographs.

The locking arrangement is actuated and controlled by a digital processor in conjunction with suitable sensors as hereinafter described.

Since, the neck portion 105 is equipped with rotary and sliding movements, during the course of capturing of images; it may warrant the use of a detachable counter weight that can counter the excessive and abnormal rotation of the neck portion 105. Accordingly, a counter weight member or a pendulum 142 is connected to the neck portion 105 to provide a counter balance, whenever the adaptor assembly 101 is not horizontal or tilted. The detachable counter weight or the pendulum 142 is connected to the neck portion 105 to ensure that the weight remains in the vertical meridian, and the left and right image capturing arms 111a and 111b remain horizontal, even when a user tilts the camera, while it is in use.

Motorized control units 144 and 144 are connected to the neck portion 105 and controlled by the digital processor, to act as a driving means for the neck portion 105 of the adaptor assembly, reciprocal to the peripheral neck portion 105a. Motorized control units 144 and 144 include suitable high speed motors of the type such as a micro motor or an ultrasonic motor, preferably having a variable speed drive means. The motorized control units 144 and 144 are connected to and controlled by the digital processor. The motorized control units 144 and 144 are also arranged to control the movements such as telescoping and converging movements, of the left and right image capturing and transferring arms 111a and 111b, in conjunction with the variable 3-D tracking members as here-in-after described.

Image sensors 146 are arranged in the neck portion 105 and optically aligned with the optical pathways of the images of the target-object 103. These sensors 146 are advantageously Dynamic Range CMOS sensors or any other similar sensors that are used to sense any abnormalities in the image quality and pixel arrangement. The Image sensors 146 are connected to the digital processor for image quality corrections and pixel manipulations.

A lens, prism and mirror complex 145 is arranged in the neck portion 105 of the 3-D adaptor assembly 101 as shown in FIG. 3. The lens, prism and mirror complex 145 is movable and equipped with linear and angular movements that are controlled by the digital processor, so as to align with optical rays originating from the images of the target-object 103 and traversing through the image capturing and transferring arms 111a and 111b. The movements of the lens, prism and mirror complex 145 are also regulated, by the digital processor, to align the optical paths of the image of the target-object 103 with other optical arrangements of the camera 100. Correction lenses, if necessary, are also used in conjunction with the lens, prism and mirror complex 145, to correct optical imperfections such as focal length errors, vignetting, distortions, chromatic aberrations etc., in the acquired optical pathways of the images.

In another aspect of the present invention a head portion 106 is formed at the distal end of neck portion 105, as shown in FIG. 3. The head portion 106 is extended laterally on both sides i.e. left and right sides of the neck portion 105 and terminated with openings 109a and 109b. The lateral extension of the neck portion 105 renders a shape of "T", in its formation. The head portion 106 of the adaptor assembly 101 is extended laterally to facilitate the integration of the image capturing and transferring arms 110a and 110b, to capture left and right images of the target-object 103 and also to facilitate optical varying of Inter Pupillary Distance between left and right eyes of the user, while using a 2-dimensional (2-D) digital camera provided with a variable 3-dimensional (3-D) photography assist arrangement of the present invention.

Lens, prism and mirror complexes 106a and 106b are arranged in head portion 106 of the adaptor assembly 101 and connected to and controlled by the digital processor. Lens, prism and mirror complexes 106a and 106b move in linear and angular directions, in order to align with the left and right optical pathways of the images of the target-object 103 and redirect the optical pathways further to the lens, prism and mirror complexes of the neck portion 105. The movements of lens, prism and mirror complex 106a and 106b are controlled by desired electro-mechanical and executed by the digital processor. The above-mentioned optical alignments can be controlled by having suitable controls 104a,b in the camera 100.

Hinges 110a and 110b mounted at the openings 109a and 109b of the head portion 106. The hinges 110a and 110b act as pivots for connecting the image capturing and transferring arms 111a and 111b. The hinges 110a and 110b are provided to secure the angular movement of the image capturing and transferring arms 111a and 111b, in a symmetrical and synchronized manner. Couplers can also be arranged in place of hinges or pivots. The hinges 110a and 110b are operable by the digital processor.

Left image capturing and transferring arm 111a is movably coupled to the hinge 110a. The left image capturing and transferring arm 111a is defined by a series of tubular links or bits 112a that are contiguously connected. The tubular links 112a are inter-connected with each other by means of elbow joints 113a. The elbow joints 113a impart bending or folding connectivity to the tubular links 112a. The diameter of tubular links 112a is suitably varied to enable a telescoping fitment one tubular link 112a into another and to facilitate extension and retraction movements of the tubular links 112a, from and into one another, upon actuation of the left image capturing and transferring arm 111a. In this arrangement, the tubular links 112a of the left image capturing and transferring arm 111a is arranged to move angularly at an angle θ with the help of elbow joints 113a and laterally through telescoping joints, from the head portion 106. The elbow joints 113a facilitate bending of tubular links 112a, while the left image capturing arm 111a attempts to focus or converge on the target-object 103, at variable angular convergence positions. The movements of the image capturing and transferring arm 111a arm is actuated mechanically, through a motor-controlled prime mover and regulated by the digital processor. In cameras with autofocus arrangement, suitable modifications are made to the existing autofocus arrangement to control the angular and lateral movements of the image capturing and transferring arm 111a. The tubular links 112a of the left image capturing and transferring arm 111a are made of metallic, alloy or suitable polymeric materials. The elbow joints 113a are covered with opaque and flexible sheaths or bellows 114a to prevent any optical interference.

In another aspect of the present invention, variable 3-D tracking member 120a is advantageously arranged in the left image capturing and transferring arm 111a to track and capture the desired facets of the target-object 103 and render dynamically, the left spatial image of the target-object 103, in real time, to the user. The tracking member 120a includes a micro video camera (not shown in the Figures) or any suitable image capturing devices with a suitable resolution and optical features that can capture both still and video images dynamically. The digital processor is connected to the micro video camera to receive inputs or signals. 3-D tracking member 120a also includes sensors are used to measure and capture the distance of the target-object 103 and are controlled by the Digital Processor. The micro video camera that is advantageously used in the present invention possesses six-degree-of-freedom (6-DOF) of operation, which tracks positions of the target-object 103 in x, y, and z axes, and the orientation in the form of yaw, pitch, and roll, of target-object 103.

Another set of lens, prism and mirror complex 115a is arranged in left image capturing and transferring arm 111a and is equipped with linear, telescoping and angular movements, so as to reciprocate the corresponding movements of the left image capturing and transferring arm 111a, while capturing the images of the target-object 103, at variable converging angles. The movements of the lens, prism and mirror complex 115a are regulated to align the optical pathway of the image of the target-object 103 with other optical pathways and arrangements of the camera 100. The movements of lens, prism and mirror complex 115a are controlled by desired electro-mechanical and controlled by the digital processor. The control mechanisms and the associated actuating members can also be suitably provided as control switches 104a,b.

A reflecting mirror 116a in conjunction with other required optical devices such as lens and prism, is mounted advantageously at the terminal end of the image capturing and transferring arm 111a, to direct the image on to the display unit 104 of the camera 100 through the converging lens.

A plane polarized light filter 117a at the distal end of the image capturing and transferring arm 111a, along with a suitable lens, prism and mirror complex arrangement, is positioned in the input light pathway of the image of the target-object 103. The plane polarized light filter 117a is enabled with linear, vertical and lateral orientations.

Graticules 116c are arranged in the distal portion of the image capturing and transferring arm 111a, with a suitable pattern to focus on the target-object 103 at variable converging angles. The graticules 116c are used to facilitate the alignment or fusing the image as captured by the image capturing and transferring arms 111a and 111b. The graticules 116c can also be suitably arranged at a different location of the image capturing and transferring arm 111a.

The left image capturing and transferring arm 111a is actuated to extend and move angularly to focus or converge on the target-object 103, by the cumulative movements of the tubular links 112a and locks on to the target-object 103. The corresponding optical or light pathway of the image portion is transmitted through the left image capturing and transferring arm 111a, along an independent axis. The light pathway is regulated inside the left image capturing and transferring arm 111a by means of the lens, prism and mirror complexes 115a, before it is received by the converging and diverging lens complex 108. The converging and diverging lens complex 108 converges the image of the target-object 103 as carried by the left image capturing and transferring and transferring arm 111a and focuses on the LCD display 104, through a CCD 118.

In a similar way a right image capturing and transferring arm 111b is coupled to the hinge 110b of the opening 109b. The right image capturing arm 111b is defined by a series of tubular links or bits 112a that are contiguously connected. The tubular links 112b are inter-connected with each other by means of elbow joints 113b. The elbow joints 113b impart bending or folding connectivity to the tubular links 112b. The diameter of tubular links 112b is suitably varied to enable a telescoping fitment one tubular link 112b into another and to facilitate extension and retraction movements of the tubular links 112b, from and into one another, upon actuation of the left image capturing arm 111b. In this arrangement, the tubular links 112b of the left image capturing and transferring arm 111b is arranged to move angularly at an angle θ with the help of elbow joints 113b and laterally through telescoping joints, from the head portion 106. The elbow joints 113b facilitate bending of tubular links 112b, while the right image capturing and transferring arm 111b attempts to focus or converge on the target-object 103, at variable angular convergence positions. The movements of the right image capturing and transferring arm 111b are actuated mechanically, through a motor-controlled prime mover and regulated by the digital processor. In cameras with autofocus arrangement, suitable modifications are made to the existing autofocus arrangement to control the angular and lateral movements of the right image capturing and transferring arm 111b. The tubular links 112b of the right image capturing and arm 111b are metallic and suitable polymeric materials are also used for these tubular links 112b. The elbow joints 113b are covered with opaque and flexible sheaths or bellows 114b to prevent any optical interference.

In another aspect of the present invention, variable 3-D tracking member 120b is advantageously arranged in the left image capturing and transferring arm 111b to track and capture the desired facets of the target-object 103 and render dynamically, the left spatial image of the target-object 103, in real time, to the user. The tracking member 120b includes a micro video camera (not shown in the Figures) or any suitable image capturing devices with a suitable resolution and optical features that can capture both still and video images dynamically. The digital processor is connected to the micro video camera to receive inputs or signals. 3-D tracking member 120b also includes sensors are used to measure and capture the distance of the target-object 103 and are controlled by the Digital Processor. The micro video camera that is advantageously used in the present invention possesses six-degree-of-freedom (6-DOF) of operation, which tracks positions of the target-object 103 in x, y, and z axes, and the orientation in the form of yaw, pitch, and roll, of target-object 103. The digital processor is connected to the micro video camera to receive inputs or signals.

Another set of lens, prism and mirror complex 115b is arranged in left image capturing and transferring arm 111b and is equipped with linear, telescoping and angular movements, so as to reciprocate the corresponding movements of the left image capturing and transferring arm 111b, while capturing the images of the target-object 103, at variable converging angles. The movements of the lens, prism and mirror complex 115b are regulated to align the optical path of the image of the target-object 103 with other optical arrangements of the camera 100. The movements of lens, prism and mirror complex 115b are controlled by the digital processor, with an appropriate actuating mechanism arranged in the camera. The movements of lens, prism and mirror complex 115a are controlled by desired electro-mechanical and controlled by the digital processor. The control mechanisms and the associated actuating members can also be suitably provided as control switches 104a,b.

A reflecting mirror 116b in conjunction with other optical devices such as lens and prism is mounted, at the terminal end of the image capturing and transferring arm 111b, to direct the image on to the display unit 104 of the camera 100 through the converging and diverging lens complex 108.

A plane polarized light filter 117b at the distal end of the image capturing and transferring arm 111b, along with a suitable lens, prism and mirror complex arrangement, is positioned in the input light pathway of the image of the target-object 103. The plane polarized light filter 117b is enabled with linear, vertical and lateral orientations.

Graticules 116d are arranged in the distal portion of the right image capturing arm 111b, with a suitable pattern to focus on the target-object 103 at variable converging angles. The graticules 116d are used to facilitate the alignment or fusing the image as captured by the image capturing and transferring arms 111a and 111b. The graticules 116d can also be suitably arranged at a different location of the image capturing and transferring arm 111b.

3-D tracking members 120a and 120b with micro video cameras that are arranged in the image capturing and transferring arms 111a and 111b, advantageously at their peripheral ends to record landmarks of the captured image for further processing by the digital processor. The micro video cameras of the left 3-D tracking member captures, at the instance of a user, a desired left image of the target-object 103 by the actuation of the left image capturing and transferring arm 111a, in conjunction with graticules 116c. This captured image will be treated as reference picture and the digital processor locks the left image capturing and transferring arm 111a on the target-object 103. Similarly, the right left image capturing and transferring arm 111b captures the corresponding right images of the target-object 103 and the left image is compared with the reference picture of the right image through pixel mapping. Deviation, if any, in the right and left images thus captured is measured and analyzed. An appropriate action is taken by the digital processor to adjust, align and focus image capturing and transferring arms 111a and 111b on the target object 103 at the desired angle with zero eccentricity in the right and left images.

A horizon parallel indicator (not shown in the drawings) is arranged on the camera 100 to facilitate horizontal level for the camera with respect to the target-object and to prevent any parallax errors.

The image capturing and transferring arms 111a and 111b have multiple joints and elbows which move independent of each other. The arms move synchronously, independently, manually or automatically, symmetrically as well as non-symmetrically, for focusing the target-object 103. So the length of the image capturing and transferring arms 111a and 111b can be varied based on the distance of the target from the camera 100, as well as the need for enhancement of 3-D effect and variable depth perception.

In further aspect of the present disclosure, the image capturing and transferring arms 111a and 111b can be arranged in folded positioned across the body of the camera 100 or arranged inside the camera 100 and released to extend and move at the time of operations.

Figure 4:
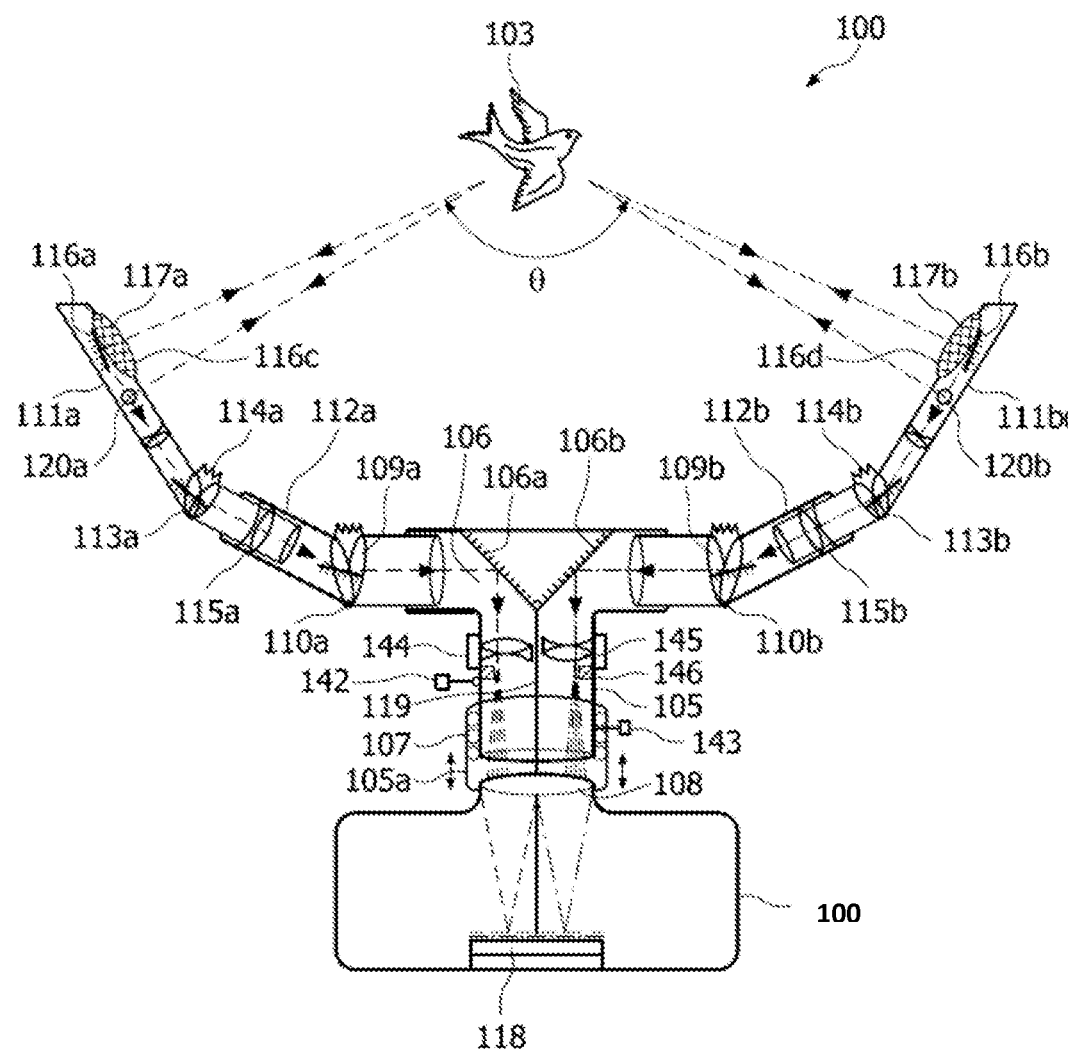
FIG. 4 illustrates a cross-sectional view of the adaptor assembly with variable 3-D photography assist arrangement, having a partition and where a single image is shared by a single LCD.

In another aspect as shown in FIG. 4, image capturing and transferring arms 111a and 111b are connected to the adaptor assembly 101 as shown in FIG. 3. A partition 119 is provided separating the left and right portions of the 3-D adaptor assembly 101. The partition element 119 extends vertically across the cross-section of the adaptor assembly 101 and separates the left and right portions physically and optically. The separation of the 3-D adaptor 101 facilitates the separation and transmission of left and right optical pathways, carrying the left and right parts of the image of the target-object 103 through the left and right portions from the converging and diverging lens complex 108. A single LCD 104 along with a CCD 118 is shared between the left and right portions of the adaptor 101, which receives the respective left and right images. In this arrangement, there is no superimposition of the left and right images on the LCD 104. The 3-D tracking member 120b as described above is also used in this embodiment for tracking the target-object 103 and locking the image capturing and transferring arms 111a and 111b.

In another aspect of the present disclosure, two separate LCDs and CCDs also can be used to display the left and right images separately.

Figure 5:
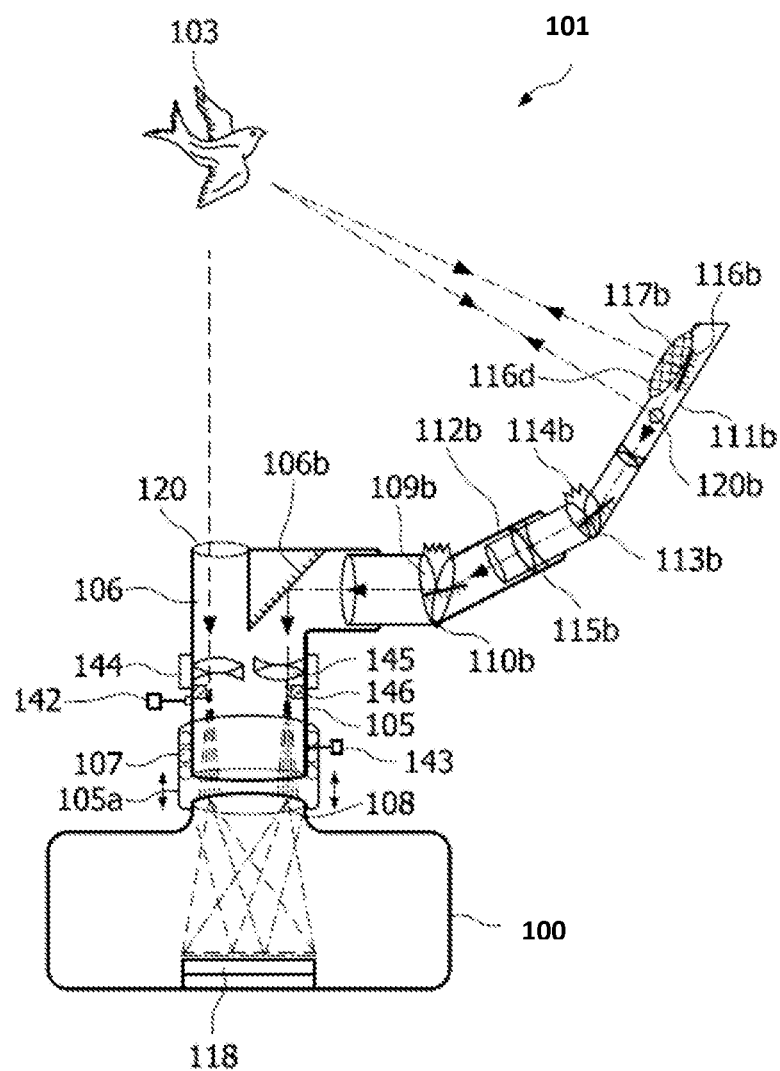
FIG. 5 illustrates a cross-sectional view of the adaptor assembly with a variable 3-D photography assist arrangement, having a single image capturing and transferring arm.

In yet another aspect of the present disclosure as shown in FIG. 5, the adaptor assembly 101 along with the 3-D tracking member 120b as shown in FIG. 3 is used. The head portion 106 of the 3-D adaptor assembly 101 is provided with a front aperture 120 and a lateral opening 109b. The front aperture 120 is provided with an optical lens along with desirable corrective set of optical arrangement such as lens, prism and mirror complexes 145 with image sensors 146 to receive one set of incident rays (optical pathways) from the target-object 103 directly into the front aperture 120. The front aperture 120 can be provided with suitable optical system to align the optical pathway from the target-object 103 on to the converging and diverging lens complex 108. A single image capturing member 111b with connecting bits and elbows as shown in FIG. 1 is connected fixed to the 3-D adaptor assembly 101 as shown in FIG. 5. The image capturing and transferring arm 111b is arranged to receive optical pathway of the image of the target-object 103, captured from various angular positions. Lens, prism, mirror complex 115b is arranged in the image capturing member 111b to receive and transmit the optical pathways of the image. A polarized filter 117b to is arranged at the terminal end of the image capturing and transferring arm 111b. A mirror 116b is arranged in proximity to the polarizing filter 117b to reflect and direct the image to other optical arrangement of the assembly. A single converging and diverging lens complex 108 is optically divided with one part receiving the optical pathway of the image directly from the target-object 103 and the other part arranged to receive the optical pathway of other portion of the image through image capturing and transferring arm 111b. A single LCD 104 with CCD 118 is arranged to receive the optical pathways i.e. directly received from the target-object 103 and through the single movable image capturing and transferring arm 111b. Alternately, two CCDs can also be arranged to receive the respective images of the target-object 103.

Figure 6:
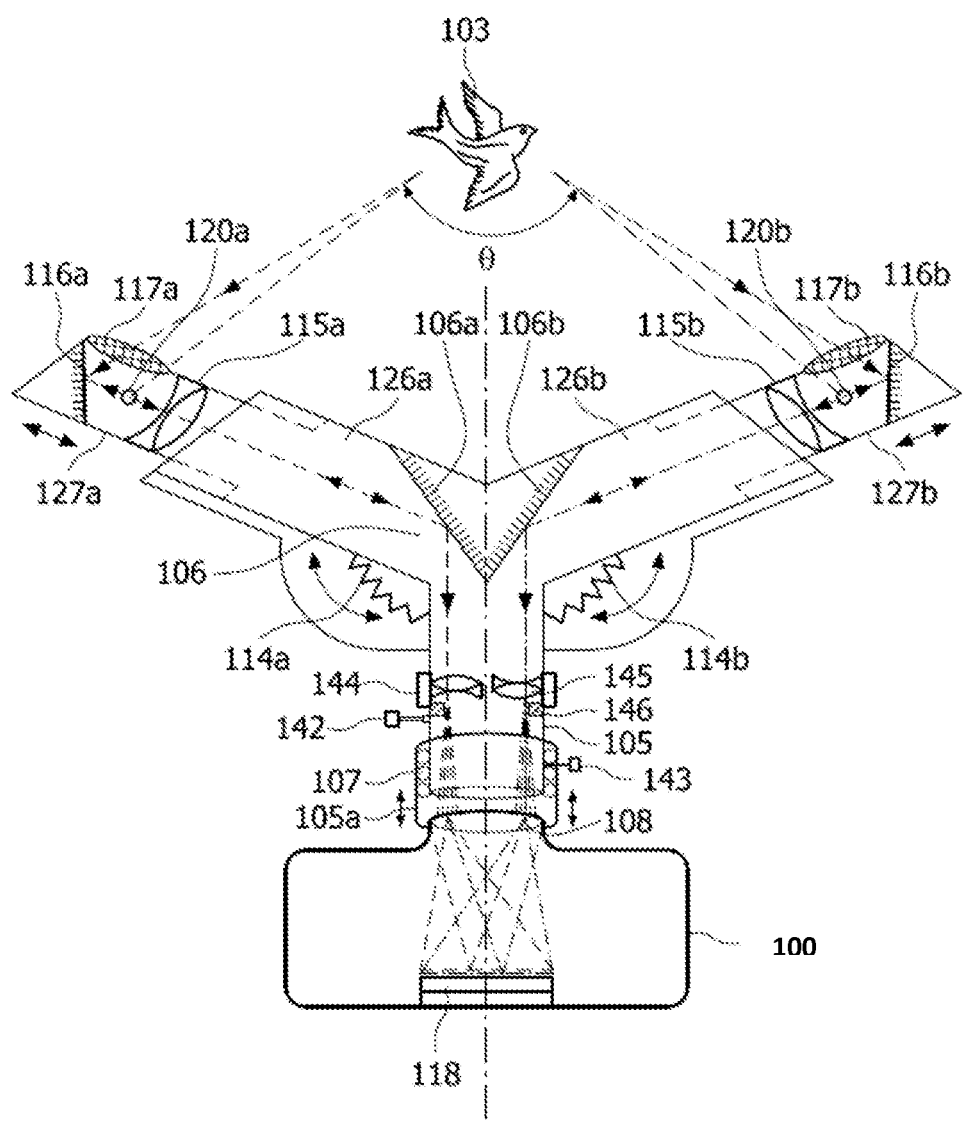
FIG. 6 illustrates a cross-sectional view of the adaptor assembly with a variable 3-D photography assist arrangement, connected to rigid image capturing and transferring arms with a telescoping arrangement.

In another aspect of the present disclosure, the adaptor assembly 101 along with the 3-D tracking member 120b as shown in FIG. 3 is used in conjunction with a pair of hollow and rigid image capturing members 126a and 126b, as shown in FIG. 6. In this arrangement tracking member 120b is arranged in the telescoping arms 127a and 127b. The telescoping arms 126a and 126b are actuated to converge on the target-object 103 and render a variable 3-D perception of the target-object 103. The combination of telescoping actions of the telescoping arms 127a and 127b and rotary actions of the image capturing members 126a and 126b is used to provide a variable degree of convergence on the target-object 103 and render a variable 3-D perception of the target-object 103.

Figure 7:
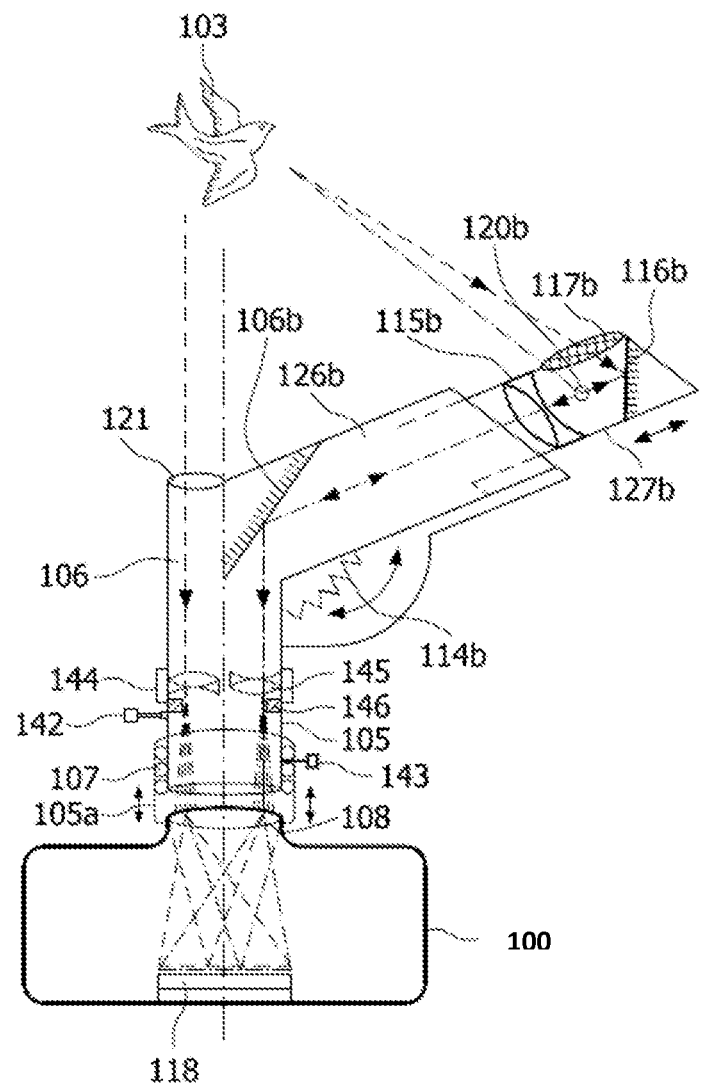
FIG. 7 illustrates a cross-sectional view of the adaptor assembly with variable 3-D photography assist arrangement, connected to a single and rigid image capturing and transferring arms with a telescoping arrangement.

In yet another aspect of the present disclosure the adaptor assembly 101 along with the 3-D tracking member 120b as shown in FIG. 3 is also used in conjunction with the single image capturing member 126b is used, to render a 3-D depth perception of the target-object 103, as shown in FIG. 7, along with a single telescoping arm 127b. In this aspect, an image portion of the target-object 103 is received by the camera 100 directly through the aperture 121 and another portion of the image of the target-object 103 is captured by the combination of telescoping actions of the telescoping arm 127b and rotary actions of the image capturing member 126b, to render a variable degree of angle of convergence of the target-object 103. An image correcting and regulating optical arrangement 115b including a lens, prism and mirror complex is housed in the image capturing member 126b to compensate for any loss of optical quality of the optical or light path of the image of the target-object 103.

Figure 8:
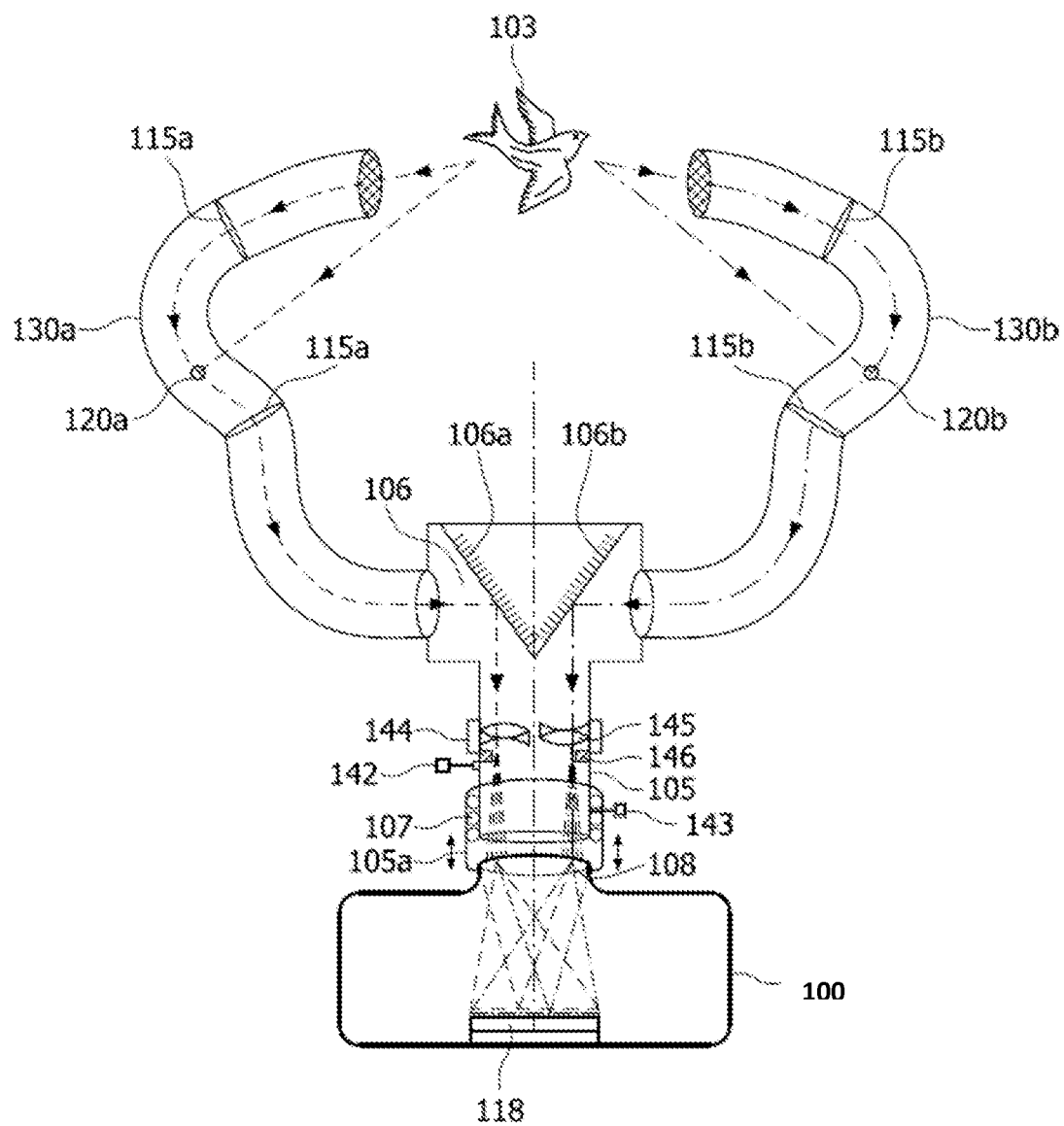
FIG. 8 illustrates a cross-sectional view of the adaptor assembly with variable 3-D photography assist arrangement, connected to flexible image capturing and transferring arms.

In another aspect of the present disclosure, the adaptor assembly 101 along with the 3-D tracking member 120b as shown in FIG. 3 is also used in conjunction with a pair of flexible optic fiber conduits 130a and 130b are connected to the head portion of the adaptor assembly 101, as shown in FIG. 8 to act as image capturing members and to focus on the target-object 103 at variable convergence angles and to render a variable 3-D image of the target-object 103. Suitable image correcting and regulating optical devices are incorporated in the image capturing members 126a and 126b, to compensate for any loss of optical quality of the optical or light path of the image of the target-object 103.

In yet another aspect of the present disclosure, a single flexible fiber optic conduit is connected to the head portion of the adaptor assembly, to act as an image capturing member, along with suitable image correcting and regulating optical devices.

In yet another aspect of the present disclosure the 3-D adaptor assembly 101 of the present disclosure and can also be used in conjunction with video cameras to capture video images in 3-D. In this aspect the camera captures the video images of the target object 103 at various angular converging positions and target-object displacement positions. The automated image capturing and transferring arms 111a and 111b are driven by a set of instructions to track the target-object an enhanced depth perception of a spatial image of a target-object and with zero eccentricity between left and right images position. The variable 3-D aspects are adjusted based on pre-set conditions to compensate for apparent acceleration and deceleration of the target-object 103. The synchronous and asynchronous movements of the image capturing and transferring arms 111a and 111b are enabled by a set of instructions, to keep the target-object 103 in a central and focused view.

Figure 10:
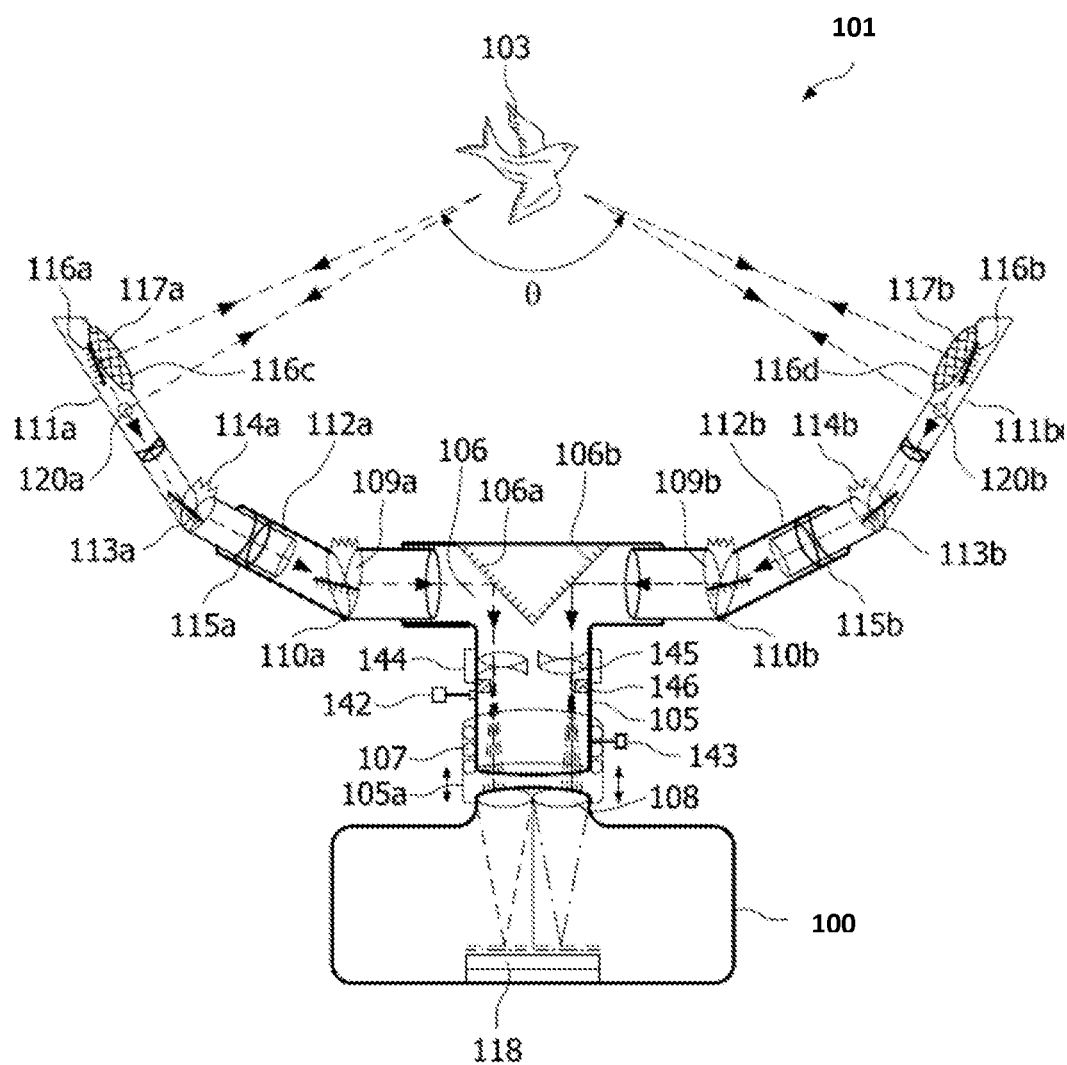
FIG. 10 illustrates a cross-sectional view of the adaptor assembly with variable 3-D photography assist arrangement with two converging/diverging lenses arranged in the adaptor.

In yet another aspect of the present invention as shown in FIG. 10 the adaptor assembly 101 as shown in FIG. 3, is provided with a pair of converging/diverging lens complexes 108 to receive two independent optical rays from the target-object 103 and focus the left and right images on left and right display devices 118.

Figure 9:
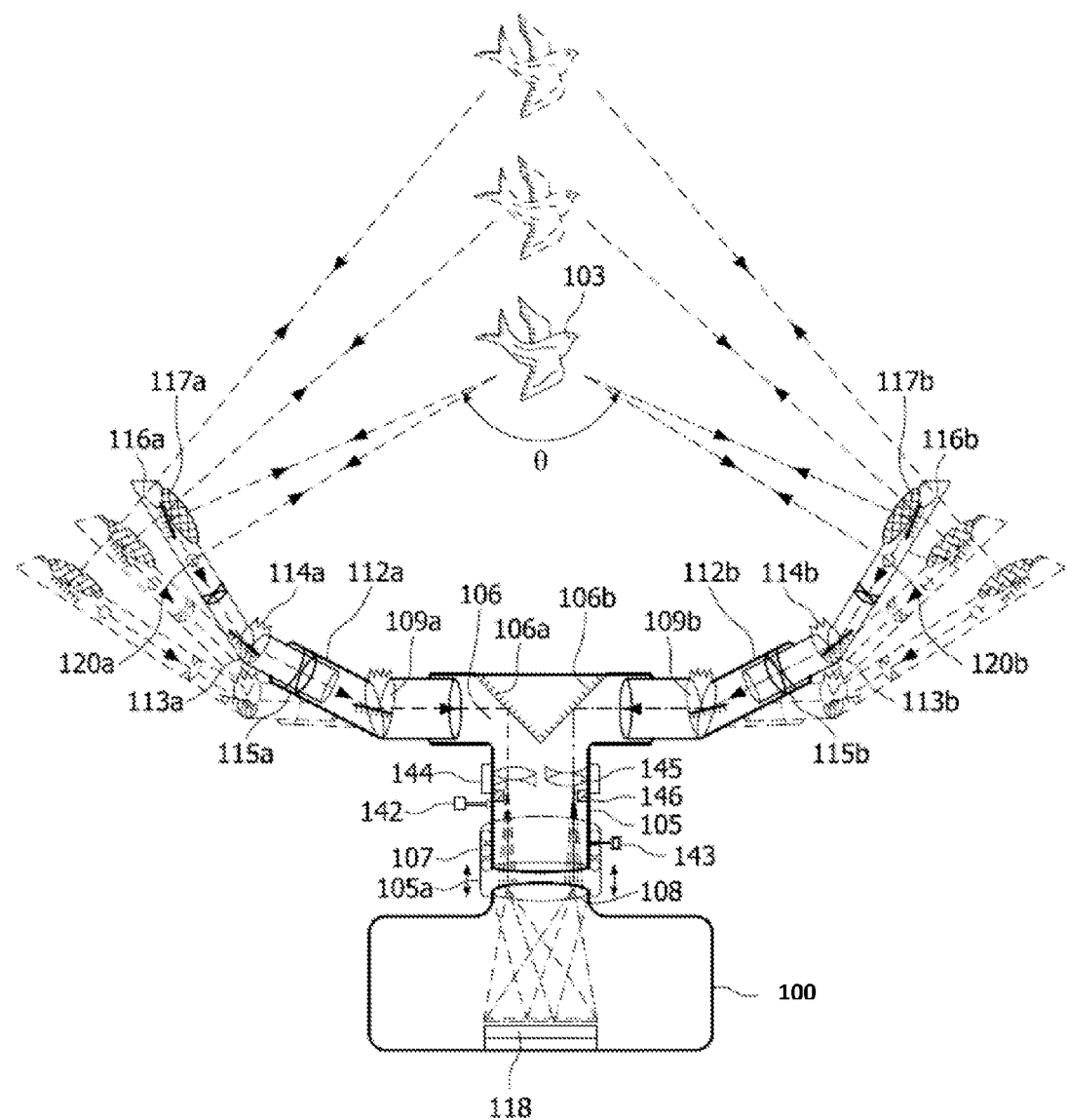
FIG. 9 illustrates a cross-sectional view of functional aspects of the adaptor assembly with variable 3-D photography assist arrangement, with image capturing and transferring arms positioned at various angular positions to capture still and video images of a target-object.
Figure 12:
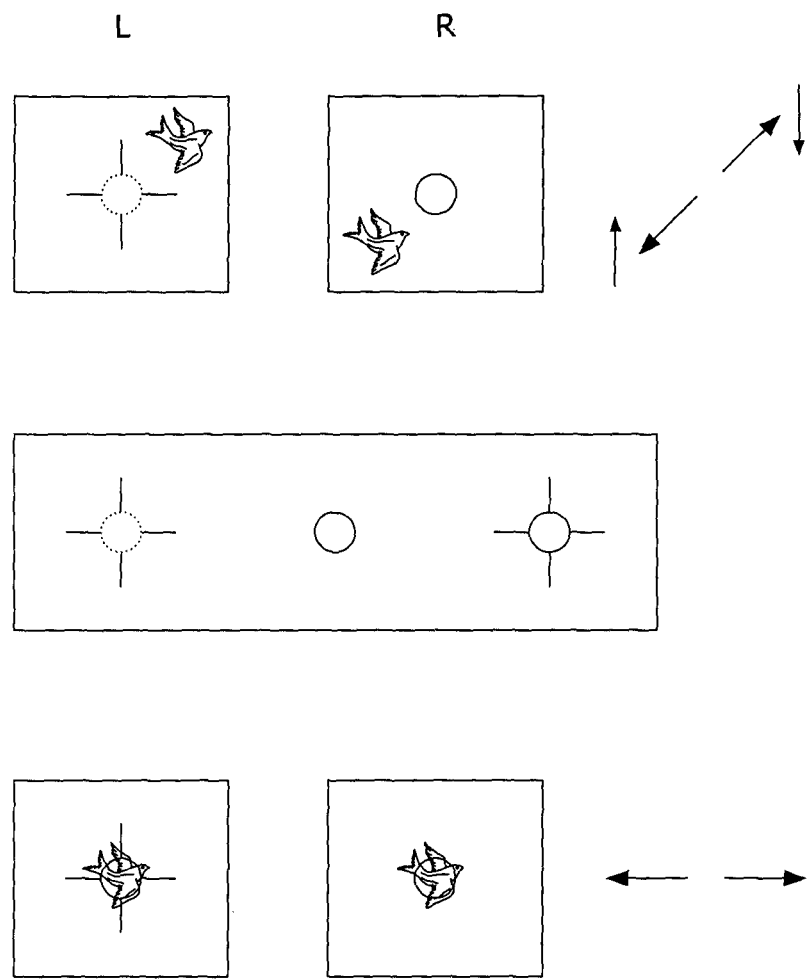
FIG. 12 illustrates a graphical depiction of a spatial image of a target-object with zero eccentricity between left and right images.

In accordance with another aspect of the present invention, when a 2-D camera (still or video camera) is fitted with the adaptor assembly 101 of the present invention is used by a user, to capture an image(s) of the target-object 103, the requisite switch controls 104a,b of the camera 100 are actuated. The digital processor (with various functional executables pertaining to the variable 3-dimensional (3-D) photography/videography assist arrangement) takes control of the operation of the adaptor assembly 101. The rotary and frontal movements of the head portion 105 that is connected to the lens barrel 112 of the camera are initiated, in a controlled manner. In an exemplary manner as shown in FIG. 3, the rolling mass bodies 107 that are powered by the motor control unit 144 actuates and assists in the rotary and frontal movement of the neck portion 105. Alternately, the neck portion 105 can also be actuated by gliding the neck portion 105 in conjunction with the peripheral neck portion 105a. The image sensors 146 that are arranged in the neck portion 105 provide necessary signals to the digital processor to orient the image capturing and transferring arms 111a and 111b to optically align with the optical pathways of the images of the target-object 103. The lens, prism and mirror complex 145 also moves in linear and angular directions, as controlled by the digital processor, so as to align with optical rays originating from the images of the target-object 103 and traversing through the image capturing and transferring arm 111a. The micro video camera and distance measuring sensor of the 3-D tracking member 120 will start functioning to capture the target-object 103. The left image capturing and transferring arm 111a, in accordance with the signals as received by the digital processor from 3-D tracking member 120, moves and extends (telescoping), at variable angular directions, to converge on the target-object 103, so as to attain individual fixation on the target-object 103, and the micro video camera captures landmarks of the image of the target-object 103, at that particular angle, as shown in FIG. 9. The landmarks include various pixel patterns, contours, orientation, RGB and HLS values and other aspects of the target-object 103. This captured image(s) also called the "locked image", will be treated as reference picture and the digital processor locks the left image capturing and transferring arm 111a at that converging angle (θ) of the target-object 103, as shown in FIG. 12, where the pattern of the graticules of the left image capturing and transferring arm 111a is centered and focused on the target-object 103. Similarly, the right image capturing and transferring arm 111b captures the corresponding right image of the target-object 103 and values are compared with the reference picture of the left image through pixel mapping. Deviation, if any, in the right and left images thus captured is measured and analyzed. An appropriate action is taken by the digital processor to adjust the alignment of the image capturing and transferring arms 111a and 111b, on the target object 103, to bring in zero eccentricity as shown in FIG. 12. Once the convergence on the target-object 103 is achieved and eccentricity in the right and left image capturing and transferring arms 111a and 111b is removed, the locking device 143 is actuated to lock the image capturing and transferring arms 111a and 111b on the target-object 103 and the corresponding optical or light pathways of the image portion are transmitted through the left and right image capturing and transferring arms 111a and 111b, along independent axes. The indicators as provided on the neck portion 105 can also be used to lock the adaptor at a desired converging angle. The light pathways are regulated inside the image capturing and transferring arms 111a and 111b by means of the lens, prism and mirror complexes, before they are received at the converging and diverging lens complex 108. The image sensors 146 and lens, prism and mirror complexes located in the head portion 105 operate to improve optical quality of the light rays of the target-object 103, before they fall on the converging and diverging lens complex 108. The converging and diverging lens complex 108 converges the light rays of the target-object 103 as carried by the left and right image capturing and transferring arms 111a and 111b and focuses the image on the display unit 104. The display unit will have superimposed images (left and right images of the target-object 103), carried by left and right image capturing and transferring arms 111a and 111b, through two non-parallel axes. These two images differ in detail due to left and right optical viewing positions and the depth angle (3-D angle) distances. The 3-D effect of the images can be seen through polarized 3-D glasses. The 3-D images that are rendered will have an enhanced depth perception of the spatial image of a target-object 103. The 3-D images that are captured can also be projected on a LCD, a screen, a TV device and viewed through polarized 3-D glasses.

ADVANTAGES OF THE PRESENT INVENTION

The adaptor assembly for a 2-dimensional (2-D) digital camera provided with a variable 3-dimensional (3-D) photography assist arrangement of the present disclosure can be easily connected to any digital camera and is also easily detachable.

The adaptor assembly for a 2-dimensional (2-D) digital camera provided with a variable 3-dimensional (3-D) photography assist arrangement of the present disclosure enables a natural convergence of human eyes on a single LCD through polarized 3-D glasses, enabling a 3-D viewing of the target-object.

The adaptor assembly for a 2-dimensional (2-D) digital camera provided with a variable 3-dimensional (3-D) photography assist arrangement of the present invention eliminates the tilting errors in the left and right images and to render zero eccentricity.

It will thus be seen that the embodiments as set forth above, are efficiently attained and since certain changes may be made in carrying out the present invention without departing from the spirit and scope of the invention, it is intended that all matter contained in the above description and shown in the accompanying drawings be interpreted as illustrative and not in a limiting sense.

It is also understood that the following claims are intended to cover all the generic and specific features of the invention herein described and all statements of the scope of the invention, which as a matter of language might be said to fall therebetween.

The invention claimed is:

1. An adaptor assembly for a 2-dimensional (2-D) digital camera with a variable 3-dimensional (3-D) photography assist arrangement, comprising:
   (a) a peripheral neck portion functionally detachably connected to lens barrel of the camera;
   (b) a rotatable and movable neck portion is permitted to pass through peripheral neck portion with a raceway disposed between the neck portion and the peripheral neck portion, and the neck portion operably connected to the lens barrel with an intervening space;
   (c) rolling mass bodies disposed in the raceway;
   (d) a head portion extending from the rotatable and movable neck portion; and
   (e) image capturing and transferring arms functionally connected to the head portion to capture a left image and right image resulting in a 3-dimensional image of a target-object at variable converging angles by movement of the rotatable and movable neck portion and/or the image capturing and transferring arms, and with a zero eccentricity between left and right images of the target-object.

2. The adaptor assembly as claimed in claim 1, wherein the rolling mass bodies are ball bearings, roller thrust bearings or needle bearings.

3. The adaptor assembly as claimed in claim 1, wherein the neck portion and peripheral neck portion are rotatably and movably abutted to each other.

4. The adaptor assembly as claimed in claim 1, wherein plurality of indicators with the range of 0-360 degrees, disposed on the neck portion, with a corresponding reference indicator indicated on the peripheral neck portion.

5. The adaptor assembly as claimed in claim 1, wherein anti-tilt lock device connected to the neck portion.

6. The adaptor assembly as claimed in claim 1, wherein a detachable counter-weight member disposed on the neck portion.

7. The adaptor assembly as claimed in claim 1, wherein motorized control unit is connected to the neck portion.

8. The adaptor assembly as claimed in claim 1, wherein a plurality of lens, prism or mirror complexes disposed in the neck portion, head portion and in the left and right image capturing and transferring arms.

9. The adaptor assembly as claimed in claim 1, wherein image correcting and aligning sensors are disposed in the neck portion.

10. The adaptor assembly as claimed in claim 1, where at least a converging and diverging lens complex is disposed in the neck portion.

11. The adaptor assembly as claimed in claim 1, wherein variable 3-D tracking members disposed at the distal ends of the image capturing and transferring arms.

12. The adaptor assembly as claimed in claim 1, wherein a single image capturing and transferring arm is connected to the head portion.

13. The adaptor assembly as claimed in claim 1, wherein the image capturing and transferring arms are rigid or flexible.

* * * * *